United States Patent [19]

Ward

[11] Patent Number: 5,448,762
[45] Date of Patent: Sep. 5, 1995

[54] METHOD AND APPARATUS FOR MOBILE RADIO COMMUNICATIONS HAVING SWITCHED DUAL FREQUENCY SYNTHESIZERS

[75] Inventor: Torbjorn Ward, Stockholm, Sweden
[73] Assignee: Telefonaktiebolaget LM Ericsson, Stockholm, Sweden
[21] Appl. No.: 159,956
[22] Filed: Dec. 1, 1993

Related U.S. Application Data

[63] Continuation of Ser. No. 666,086, Mar. 7, 1991, abandoned.

[51] Int. Cl.$^6$ ............................................. H04B 1/40
[52] U.S. Cl. ..................... 455/67.1; 455/76; 455/183.1; 370/95.3
[58] Field of Search ................... 455/67.1, 67.4, 226.2, 455/77, 260, 187.1, 197.3, 183.1, 165.1, 152.1, 56.1, 33.2, 76, 119; 370/95.1, 95.3

[56] References Cited

U.S. PATENT DOCUMENTS

| | | | |
|---|---|---|---|
| 2,199,179 | 4/1940 | Koch | 250/9 |
| 3,443,228 | 5/1969 | Brenner et al. | |
| 3,532,988 | 10/1970 | Magnuski | |
| 3,619,788 | 11/1971 | Giles, Jr. et al. | |
| 3,983,492 | 9/1976 | Fisher et al. | 325/468 |
| 4,069,455 | 1/1978 | Sherman, Jr. | 325/469 |
| 4,123,715 | 10/1978 | Fathauer | 455/165.1 |
| 4,190,803 | 2/1980 | Imamura | 325/455 |
| 4,430,753 | 2/1984 | Shiratani | 455/52 |
| 4,470,140 | 9/1984 | Coffey | 370/86 |
| 4,476,582 | 10/1984 | Strauss et al. | 455/166 |
| 4,513,412 | 4/1985 | Cox | 370/29 |
| 4,641,304 | 2/1987 | Raychaudhuri | 370/95 |
| 4,688,213 | 8/1987 | Raychaudhuri | 370/93 |
| 4,736,371 | 4/1988 | Tejima et al. | 370/95 |
| 4,815,073 | 3/1989 | Grauel et al. | 370/95 |
| 4,817,089 | 3/1989 | Paneth et al. | 370/95 |
| 4,851,820 | 7/1989 | Fernandez | 455/67.1 |
| 4,910,791 | 3/1990 | Dickinson et al. | 455/67.4 |
| 4,914,649 | 4/1990 | Schwendeman et al. | 370/50 |
| 4,932,072 | 6/1990 | Toko | 455/76 |
| 4,949,335 | 8/1990 | Moore | 370/29 |
| 4,949,395 | 8/1990 | Rydbeck | 455/33 |
| 4,972,506 | 11/1990 | Uddenfeldt | 455/33 |
| 5,042,082 | 8/1991 | Dahlin | 455/33.2 |
| 5,067,171 | 11/1991 | Kawano | 455/33.2 |
| 5,070,536 | 12/1991 | Mahany et al. | 455/67.4 |
| 5,113,416 | 5/1992 | Lindell | 455/119 X |
| 5,127,100 | 6/1992 | D'Amico et al. | 455/56.1 X |
| 5,128,959 | 7/1992 | Bruckert | 455/67.1 |
| 5,179,559 | 1/1993 | Crisler et al. | 370/95.1 |

FOREIGN PATENT DOCUMENTS

| | | | |
|---|---|---|---|
| 0060115 | 3/1989 | Japan | 455/152.1 |
| 0195714 | 8/1989 | Japan | 455/152.1 |
| 2244402 | 11/1991 | United Kingdom | |

OTHER PUBLICATIONS

"Multiplexing and Multiple Access on the Radio Path," *CEPT/CCH GSM Recommendation: 05.02/1, Version 3.2.0*, Oct. 12, 1988, pp. 1–33.

Jean-Louis Dornstetter et al., "Cellular Efficiency With Slow Frequency Hopping: Analysis of the Digital SFH900 Mobile System," *IEEE Journal On Selected Areas in Communications*, vol. SAC-5, No. 5, Jun. 1987, pp. 835–848.

TIA Technical Report, "Digital Voice Channel Structure Assuming No Duplex Filters," TIA Technical Subcommittee, TR-45.3 Digital Cellular Standards, Jul. 25–17, 1989, Calgary, pp. 1–3.

Primary Examiner—Edward F. Urban
Attorney, Agent, or Firm—Burns, Doane, Swecker & Mathis

[57] ABSTRACT

In a mobile radio communications station, a communications reception frequency is generated and a time sequence of a plurality of reception monitoring frequencies is separately generated. A reception frequency is switched between the communications reception frequency during a communications reception and a current one of the monitoring reception frequencies during a monitoring reception. More particularly, separate frequency synthesizers are provided for communications reception on the one hand and signal strength monitoring on the other hand. The frequency of the synthesizer for communications reception remains fixed during the course of a communication. The synthesizer for signal strength monitoring need not be as accurate as that for communications reception. Furthermore, since the synthesizer is used only for signal strength monitoring instead of for both communications reception and signal strength monitoring, more time is available for switching between frequencies.

11 Claims, 2 Drawing Sheets

METHOD AND APPARATUS FOR MOBILE RADIO COMMUNICATIONS HAVING SWITCHED DUAL FREQUENCY SYNTHESIZERS

This application is a continuation of application Ser. No. 07/666,086, filed Mar. 7, 1991, now abandoned.

BACKGROUND OF THE INVENTION

The present invention relates to frequency synthesis in a mobile radio communications station and more particularly to such a mobile station having switched dual frequency synthesizers for communications reception and signal strength monitoring, respectively.

In mobile radio telephone systems, mobile stations are assigned to different radio base stations at different times depending on the movements of the mobile station and transmission characteristics between the mobile station and various base stations. In order to select the most suitable base station to handle communications with a particular mobile station, signal strength monitoring is performed. Conventionally, a particular mobile station has been monitored not only by its assigned base station but also by neighboring base stations to determine the most suitable base station for handling communications with the mobile station. When it becomes evident that a base station other than the base station to which it is presently assigned is better suited to handle communications with the mobile station, responsibility for the mobile station is transferred to the better suited base station in a procedure known as hand-off.

Recently, it has been proposed that signal strength monitoring be performed at both ends of the radio communications link, i.e., at the mobile stations as well as the base stations, to facilitate hand-off. Such a technique is referred to as "mobile assisted hand-off" (MAHO).

Mobile-assisted hand-off is particularly useful in digital cellular mobile telephone systems using time-division multiplex access (TDMA), since rapid deterioration of speech quality as the mobile approaches the cell border requires hand-off to be handled very quickly. The mobile station therefore prepares for hand-off in advance by measuring the received signal strength of a set of other channels during the inactive period between the receiving time slots. These measurements are used to assist in the hand-off process.

Typically, base stations are provided with a dedicated signal strength receiver but mobile stations are not. Instead, a single receiver in the mobile stations must be shared between the communications reception function and the signal strength monitoring function. In TDMA systems, this has necessitated tuning to a forward voice communications channel during a reception time slot, thereafter tuning to the frequency of a signal the strength of which is to be monitored, and then retuning to the forward voice communications channel in time for the next reception time slot. Since the time between reception time slots is short (typically 20 ms) and the frequency deviation tolerance to maintain good reception is exacting, stringent requirements are placed on the frequency synthesizer of the radio receiver. Constructing a frequency-agile frequency synthesizer that is both fast-switching and highly accurate necessarily entails considerable expense.

SUMMARY OF THE INVENTION

According to the present invention, a communications reception frequency is generated and a time sequence of a plurality of reception monitoring frequencies is separately generated. A reception frequency is switched between the communications reception frequency during a communications reception period and a current one of the monitoring reception frequencies during a monitoring reception period.

More particularly, one frequency synthesizer is provided for communications reception and another, separate frequency synthesizer for signal strength monitoring on the other hand. The frequency of the synthesizer for communications reception remains fixed during the course of a communication. The synthesizer for signal strength monitoring need not be as accurate as that for communications reception. Furthermore, since the synthesizer is used only for signal strength monitoring instead of for both communications reception and signal strength monitoring, more time is available for switching between frequencies.

DETAILED DESCRIPTION OF THE PREFERRED EMBODIMENT

Figure 1:
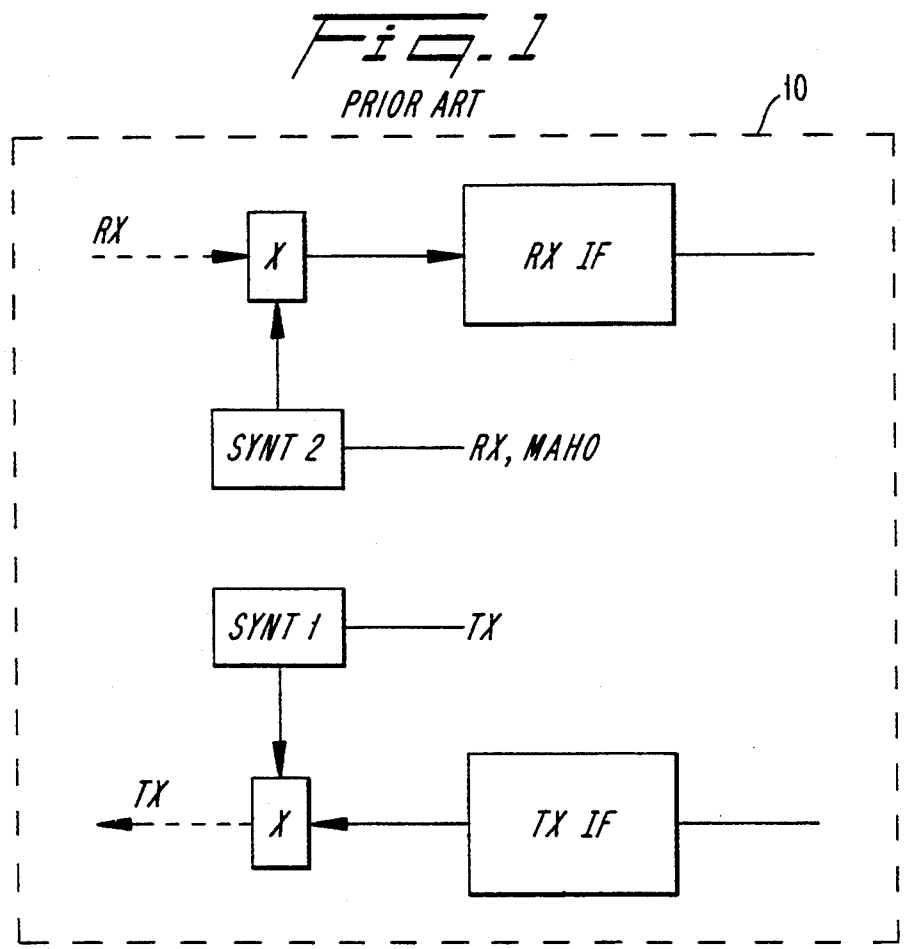
FIG. 1 is a partial block diagram of a dual-synthesizer mobile station according to the prior art.

To facilitate understanding of the present invention, it will be described below in connection with the operation of mobile-assisted handoff. It will be understood, however, that the present invention may be employed to advantage in applications apart from mobile-assisted handoff.

According to one realization of mobile-assisted hand-off, the base station informs the mobile station during call setup of several radio channels whose signal strength is to be measured by the mobile station. Normally these radio channels are the radio channels used as control channels by adjacent base stations. Depending, among other things, upon the movement of the mobile station, several new radio channels may be selected and corresponding information be transmitted to the mobile station from the base station during the course of the connection. Which channels are to be measured is therefore not always a priori known by the mobile station. During the course of a connection the mobile station measures the signal strength of signals on the given group of radio channels. Measurements may be done during time slots not used by the digital communication channel.

The mobile station also measures signal strength on the digital communication channel used for the established call connection and the bit error rate on the established call connection. The mobile station transmits results of its measurements, preferably averaged, to the base station at frequent intervals, preferably once a second.

The base station also measures signal strength on the digital communication channel used for the established connection and the bit error rate on the established connection. The base station processes and analyzes the results of its own measurements and the measurements of the mobile station and compares the results with criteria established for handoff. The base station informs the mobile switching center when, according to the results and criteria, a handoff is desirable and indicates at least one target base station assumed suitable for taking over the responsibility for the communication with the mobile.

The mobile switching center requests the target base station to measure signal strength on a radio channel in a time slot used by the mobile for the established connection. The mobile switching center also informs the target base station of the digital color code (channel identifier) used by the mobile station.

The target base station tunes a receiver to the radio channel indicated by the mobile switching center and uses a time slot identifier of the indicated time slot for burst synchronization. The target base station checks the appearance of the digital color code indicated by the mobile switching center and measures the signal strength of the burst signals provided the digital color code is correct. The target base station then transmits its results of signal strength measurement to the mobile switching center. The target base station also informs the mobile switching center of the result of the checking of the appearance of the digital color code, i.e., whether the digital voice color code appeared in the burst in the time slot of the radio channel.

The mobile switching center determines whether handoff to a target base should be performed taking into account, among other things, the results of the signal strength measurements of target base station.

When the mobile switching center determines that handoff shall be performed it transmits to the present base station and target base station information on a new radio channel, a new time slot and a new voice color code to be used by the mobile station for the connection after handoff and a new radio channel to be used by target base station for the connection after handoff.

The responsible base station forwards information on the two new radio channels, the new time slot and the new digital color code to the mobile station. After receiving this information the mobile station tunes to the new radio channel to be used for the connection by the target base station and looks for the new time slot identifier code in signals received on the radio channel. The mobile station uses the new time slot identifier code in the received signals for burst synchronization. After synchronization and tuning of its transmitter to the new radio channel the mobile station begins transmitting bursts in the new time slot on the new radio channel. The new digital color code is transmitted with each burst.

The target base station tunes a receiver to the new radio channel to be used for the connection by the mobile station and looks for the new time slot identifier code. The target base station then looks for the new digital color code in signals in the new time slot of the new channel. If the target base station identifies the new digital color code in the bursts in the new time slot of the new radio channel this is reported to the mobile switching center. The mobile switching center then interprets the handoff as successful and acts accordingly. After successful handoff the newly responsible base station informs the particular mobile station of a new group of radio channels for which signal strength is to be measured.

Referring now to FIG. 1, the radio receiver of a mobile station 10 of the prior art is represented as a mixer X having as its inputs a received radio signal RX and a frequency generated by a synthesizer SYNT 2 and outputting the combined signal to the receiver intermediate frequency circuitry RX IF. Similarly, the transmitter of the mobile station 10 is represented as the transmitter intermediate frequency circuitry TX IF and a transmission mixer X having as one of its inputs a frequency generated by a synthesizer SYNT 1. The synthesizer SYNT 1 continually supplies the transmitter with a frequency for transmission. The synthesizer SYNT 2, on the other hand, supplies the receiver with a frequency for either reception of the assigned channel or reception of a channel whose signal strength is to be measured. The synthesizer SYNT 2 is therefore required to generate different frequencies at different times during operation of the receiver of the mobile station 10.

Figure 2:
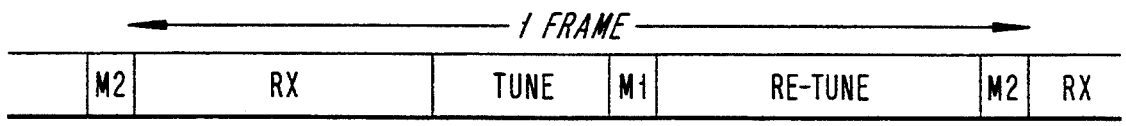
FIG. 2 is a timing diagram illustrating operation of the mobile station of FIG. 1.

Referring now to FIG. 2, operation of the mobile station of FIG. 1 during reception is illustrated in the upper portion of the figure and during transmission in the lower portion of the figure. The mobile station is assigned one time slot out of a frame of time slots for receiving radio communications directed to that particular mobile station. In this instance, the mobile station will be assumed to have been assigned the first time slot. After the conclusion of the first time slot, the remainder of the duration of the frame is available for signal strength monitoring provided that the mobile station must be ready to receive communications at the occurrence of the next reception time slot. Signal monitoring may be required not only for frequencies different from the reception frequency of the channel assigned to the mobile station but may also be required on the mobile station's own reception frequency in cases of receiver antenna diversity. In switched-antenna diversity reception, two spaced-apart antennas are provided at the mobile station with each of the antennas being used for transmission and reception purposes depending on the propagation conditions prevailing in the surrounding environment. In other words, the "better" antenna of the two at any given time slot is selected for use. Such an arrangement is optional and is to be distinguished from the more common diversity technique of using two entirely different receivers.

Referring still to FIG. 2, during a first time slot RX of the reception frame, the synthesizer SYNT 2 is tuned to the mobile station's assigned channel. During a subsequent interval TUNE, the synthesizer SYNT 2 tunes to a different frequency to monitor transmissions from a neighboring base station. During the interval M1, the signal strength of transmissions from the neighboring base station is measured. During the interval RE-TUNE, the synthesizer SYNT 2 re-tunes back to the mobile station's assigned frequency and then, during the interval M2 just before the occurrence of the next reception time slot RX, a power measurement is made in accordance with an antenna diversity arrangement. (The base station transmits continuously throughout a frame such that power received by the mobile station during the interval M2 is indicative of the power that will be received during the mobile station's assigned reception time slot RX under prevailing transmission conditions.) Since power measurement is less critical than reception of communication bursts, a shorter time TUNE is given to tune to the frequency to be measured than the time RE-TUNE given to re-tune to the assigned channel frequency. Appropriate times for the various intervals assuming a 20 ms frame time are set forth in Table 1 below.

TABLE 1

| | | |
|---|---|---|
| M2 | Power measurement for antenna diversity | 0.8 ms |
| RX | Reception of one burst | 6.7 ms |
| TUNE | Tuning to neighbor base station | 5.4 ms |
| M1 | Power measurement for MAHO | 0.2 ms |
| RETUNE | Retuning back to own base station | 6.9 ms |
| | | 20.0 |

In the prior art arrangement, since the synthesizer SYNT 2 must change frequencies twice within a single frame, once during the interval TUNE and once again during the interval RE-TUNE, and the synthesizer SYNT 2 must be able to re-tune to the original frequency with a minimum of frequency deviation, considerable effort and expense are required to construct a synthesizer that will operate satisfactorily. The synthesizer SYNT 1, however, may be of ordinary construction since it operates continuously at the same transmission frequency, at least during the course of a single communication.

Figure 3:
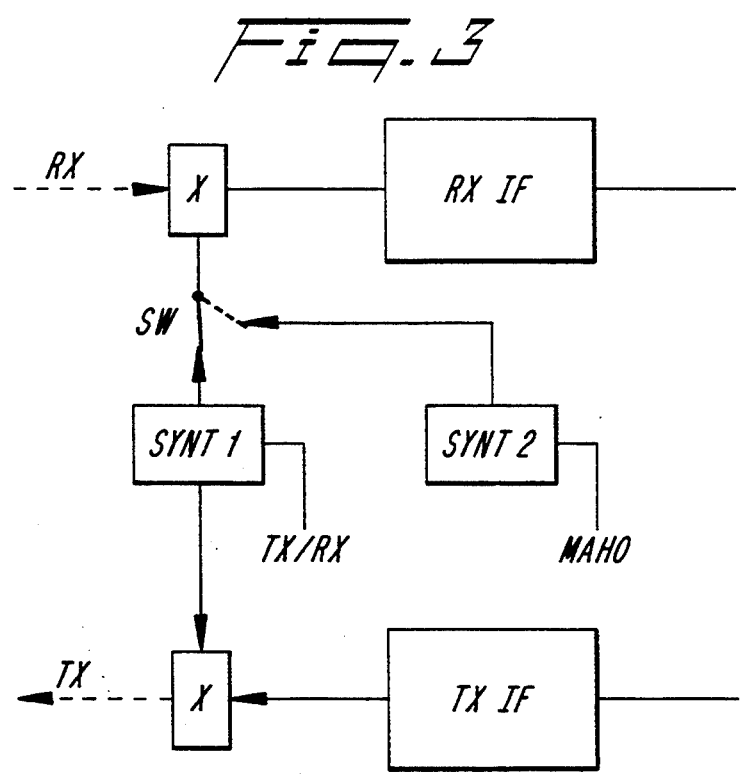
FIG. 3 is a partial block diagram of a dual-synthesizer mobile station according to the present invention.

Referring now to FIG. 3, the stringent requirements placed on synthesizer SYNT 2 in the prior art may be substantially relaxed by using separate synthesizers to perform the communications reception and signal strength monitoring functions. A switch SW is additionally provided so that either synthesizer SYNT 1 or SYNT 2 may be connected to the mixer of the radio receiver. The synthesizer SYNT 1 remains continuously adjusted to the assigned channel and may be used for both transmission and reception since the difference between the transmission and reception frequencies is constant.

The synthesizer SYNT 2 is adjusted to the channel whose strength is to be measured. During measurement, the receiver is supplied with a frequency from synthesizer SYNT 2; otherwise, it is supplied with a frequency from synthesizer SYNT 1.

Figure 4:
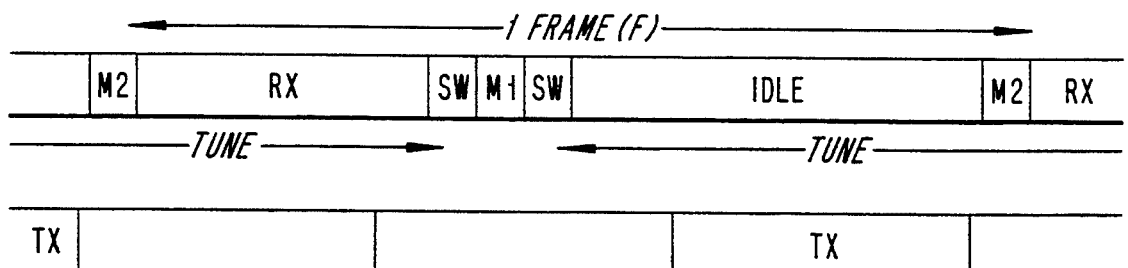
FIG. 4 is a timing diagram illustrating operation of the mobile station of FIG. 3.

Referring now to FIG. 4, the improvement of the present invention over the prior art may be appreciated. A communications burst is received in a first reception time slot RX, during which time the switch SW connects the synthesizer SYNT 1 to the radio receiver. At the conclusion of a time slot, the position of the switch is changed during the interval SW so as to connect the synthesizer SYNT 2, previously tuned to the channel whose strength is to be measured, to the radio receiver. During the interval M1, the channel signal strength is measured. The position of the switch is then changed back during the following interval SW, and the receiver remains idle until an interval M2 preceding the next occurrence of the reception time slot RX. During the interval M2, a power measurement for diversity is performed as before. Following the second switching interval SW, the synthesizer SYNT 2 will have an interval TUNE equal to an entire frame time less the interval from the beginning of the first switching period to the end of the second switching period in order to adjust to the frequency of another neighboring station to be subsequently measured.

Using a high speed switching device, a switching time considerably less than 0.1 ms should be easily obtainable as compared to the approximately 5.4 ms and 6.9 ms intervals required in the prior art to tune to a frequency to be measured and then re-tune to the original reception frequency. Assuming, for example, a switching time of 50 μs and the same times for corresponding intervals as set forth in Table 1, then SW=F−SW−M1−SW=20 ms−0.05 ms−0.2 ms−0.05 ms=19.7 ms. In other words, the synthesizer SYNT 2 has almost the entire frame time to adjust its frequency to that of another base station. The synthesizer SYNT 2 may therefore be of ordinary construction without requiring either fast frequency adjustment capability or very small frequency deviation. The foregoing calculations are summarized in Table 2 below. Since the switching time of the switch SW will vary depending upon the component used, it is represented as "x".

TABLE 2

| | | |
|---|---|---|
| M2 | Power measurement for diversity | 0.8 ms |
| RX | Reception of one burst | 6.7 ms |
| CH | Change synthesizer | x μs |
| M1 | Power measurement for MAHO | 0.2 ms |
| CH | Change synthesizer | x μs |
| IDLE | | 12.3−2x ms |
| | | 20 ms |

It should be apparent that the present invention is not limited to performing only one measurement of signal quality during a single frame and likewise is not limited to a single "measuring" synthesizer. If the time required for frequency adjustment of the synthesizer SYNT 2 allows, furthermore additional signal strength measurements may be made during the idle period of FIG. 4. Alternatively, one or more additional measuring synthesizers may be provided for connection to the radio receiver during the idle period.

It will appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. A method in a mobile radio transceiver, comprising the steps of:

generating a communications transmitter signal having a first fixed frequency during a first time interval of a reception frame and generating a communications reception signal having a second fixed frequency during a second time interval of said reception frame;

generating, separately from said first fixed frequency, a monitoring reception signal for radio signal strength monitoring during a third time interval of said reception frame between said first time interval and said second time interval, the monitoring reception signal having a monitoring frequency different from said first and second fixed frequencies; and switching between supplying to a receiver section of the transceiver said communications reception signal during said first time interval and said monitoring reception signal during said third time interval in order to monitor a radio signal strength on said monitoring frequency.

2. The method of claim 1, wherein said monitoring reception signal generating step comprises generating a monitoring reception signal having a plurality of monitoring frequencies in a time sequence, and wherein a current one of said monitoring frequencies is changed from one reception frame to a next reception frame.

3. A method according to claim 2, wherein said monitoring reception frequency generating step comprises generating in a time sequence a plurality of monitoring reception frequencies and wherein said monitoring reception frequencies are identified in radio communications.

4. The method of claim 1, wherein said monitoring reception signal generating step comprises generating a monitoring reception signal having a plurality of monitoring frequencies in a time sequence, and wherein a current one of said monitoring frequencies is changed during a third time interval of each reception frame.

5. A method according to claim 4, wherein said monitoring reception frequency generating step comprises generating in a time sequence a plurality of monitoring reception frequencies and wherein said monitoring reception frequencies are identified in radio communications.

6. A method according to claim 1, wherein said monitoring reception frequency generating step comprises generating in a time sequence a plurality of monitoring reception frequencies and wherein said monitoring reception frequencies are identified in radio communications.

7. Apparatus for transmitting and receiving communications and measuring signal strength in a mobile radio transceiver, comprising:
  first synthesizer means for generating a communications transmitter signal having a first fixed frequency during a first time interval of a reception frame and for generating a communications reception signal having a second fixed frequency during a second time interval of said reception frame;
  second synthesizer means, separate from said first synthesizer means, for separately generating a monitoring reception signal for radio signal strength monitoring during a third time interval of said reception frame between said first time interval and said second time interval, the monitoring reception signal having a monitoring frequency different from said first and second fixed frequencies; and
  means for switching between said first and said second synthesizer means such that said monitoring reception signal is supplied to a receiver section of the transceiver during said third time interval in order to monitor a radio signal strength on said monitoring frequency.

8. The apparatus of claim 7 wherein said second synthesizer means for generating a monitoring reception signal further comprises means for separately generating in time sequence a plurality of monitoring reception signals each having a respective unique monitoring frequency different from said first and second fixed frequencies, and wherein said switching means comprises means for switching to a current one of said monitoring frequencies.

9. The apparatus of claim 8 further comprising means for changing said current one of said monitoring frequencies from one reception frame to a next reception frame.

10. The apparatus of claim 8 further comprising means for changing said current one of said monitoring frequencies during a third time interval of a reception frame.

11. The apparatus of claim 7 further comprising means for alternating said second time interval and said third time interval.

* * * * *